US012608892B2

(12) United States Patent
Ogata

(10) Patent No.: US 12,608,892 B2
(45) Date of Patent: Apr. 21, 2026

(54) INFORMATION PROCESSING APPARATUS THAT DETERMINES WHETHER A USER CAN VISUALLY RECOGNIZE A MOBILE TERMINAL IN A MIXED REALITY IMAGE, SYSTEM, CONTROL METHOD, AND NON-TRANSITORY COMPUTER STORAGE MEDIUM

(71) Applicant: CANON KABUSHIKI KAISHA, Tokyo (JP)

(72) Inventor: Naoko Ogata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 181 days.

(21) Appl. No.: 18/461,437

(22) Filed: Sep. 5, 2023

(65) Prior Publication Data

US 2024/0087255 A1     Mar. 14, 2024

(30) Foreign Application Priority Data

Sep. 14, 2022    (JP) ................................. 2022-146474

(51) Int. Cl.
*G06T 19/00* (2011.01)
*G06F 3/01* (2006.01)
*G06F 3/0346* (2013.01)

(52) U.S. Cl.
CPC ............ *G06T 19/006* (2013.01); *G06F 3/013* (2013.01); *G06F 3/0346* (2013.01)

(58) Field of Classification Search
CPC .................................................... G06T 19/006
See application file for complete search history.

(56) References Cited

U.S. PATENT DOCUMENTS

| | | | |
|---|---|---|---|
| 8,502,780 B1 | 8/2013 | Park ........................... | G06F 3/02 |
| 9,791,948 B2 | 10/2017 | Sako et al. ................ | G06F 3/01 |
| 11,070,724 B2 | 7/2021 | Ihara et al. ............ | H04N 5/232 |
| 11,378,805 B2 | 7/2022 | Watanabe et al. ...... | G02B 27/01 |
| 2020/0077021 A1* | 3/2020 | Ihara ......................... | H04N 5/93 |
| 2021/0255461 A1* | 8/2021 | Watanabe .......... | G02B 27/0172 |

FOREIGN PATENT DOCUMENTS

| | | |
|---|---|---|
| JP | 2018-036974 | 3/2018 |
| JP | 2019-032713 | 2/2019 |

\* cited by examiner

*Primary Examiner* — Shivang I Patel
(74) *Attorney, Agent, or Firm* — Venable LLP

(57)     ABSTRACT
An information processing apparatus generates an image to be displayed on a display device that is mountable to a head of a user, decides an operation mode of an application, and accepts an input operation from a mobile terminal that the user is capable of holding and operating, and perform an application operation on the basis of the operation mode and the input operation. The information processing apparatus decides at least one of a first operation mode, in which the application operation is performed by the user operating the mobile terminal, and a second operation mode, in which a virtual user interface (UI) relating to an operation is displayed on the display device and the application operation is performed by the user operating the virtual UI, as the operation mode.

17 Claims, 12 Drawing Sheets

F I G. 3B
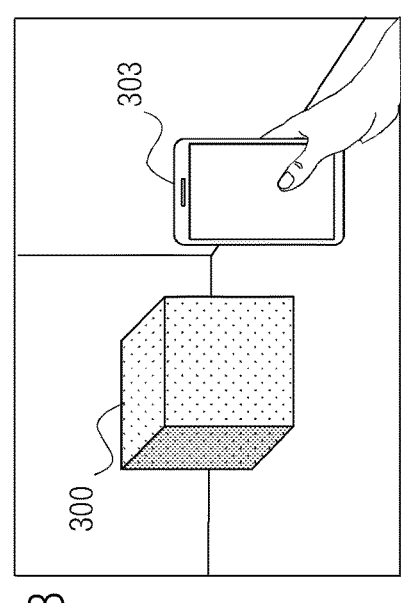
F I G. 3A
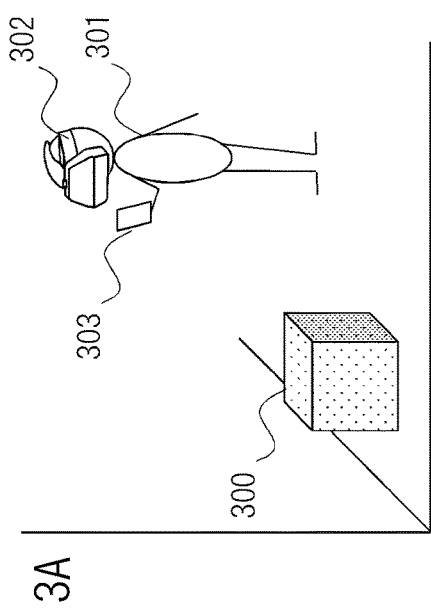
F I G. 3C
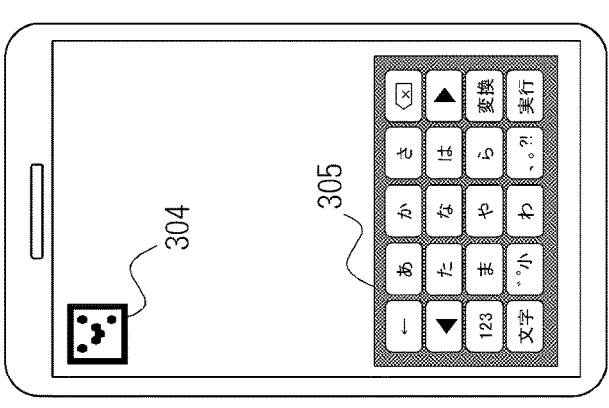

F I G. 4A
F I G. 4B
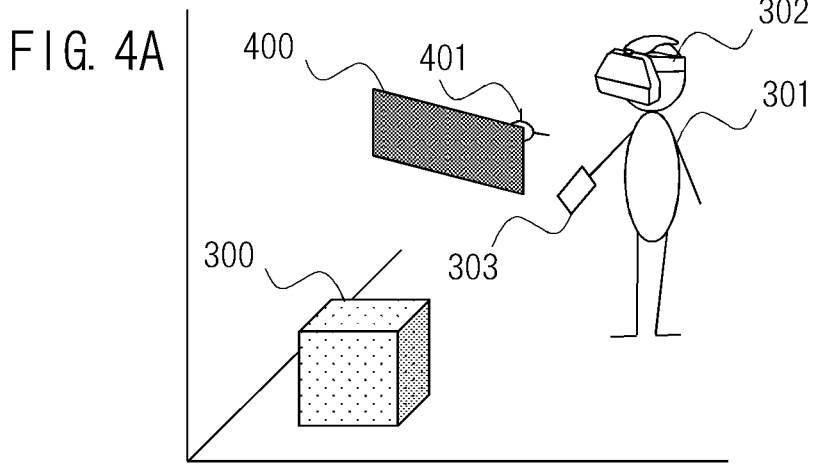

FIG. 12    1200    102
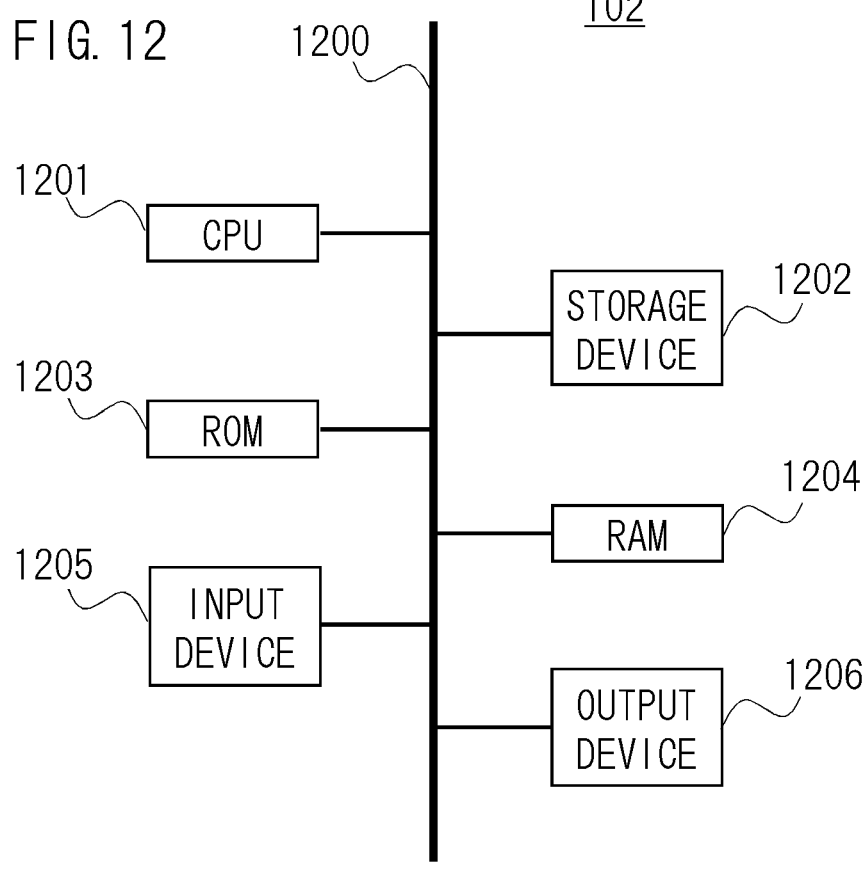
1201    CPU
1202    STORAGE DEVICE
1203    ROM
1204    RAM
1205    INPUT DEVICE
1206    OUTPUT DEVICE

INFORMATION PROCESSING APPARATUS THAT DETERMINES WHETHER A USER CAN VISUALLY RECOGNIZE A MOBILE TERMINAL IN A MIXED REALITY IMAGE, SYSTEM, CONTROL METHOD, AND NON-TRANSITORY COMPUTER STORAGE MEDIUM

BACKGROUND OF THE INVENTION

Field of the Invention

The present invention relates to application operations using a mobile terminal in an extended reality (XR) experience.

Description of the Related Art

In recent years, there is known an XR (or X-reality) technology in which a virtual world and the real world are fused in real time to create a new experience. In XR, a user uses a head-mounted display (HMD) and perform an operation while viewing an image.

When performing an operation, a user generally uses a controller that is held. Systems are provided in which the controller is a mobile terminal such as a smartphone, A tablet, or the like, which the user is accustomed to using.

In virtual reality (VR), where a virtual world is experienced, the real world is not displayed, and accordingly a real mobile terminal cannot be visually recognized. Also, in mixed reality (MR) in which a mixed reality world where information of a virtual world is superimposed on the real world, there are cases in which virtual objects are superimposed on the real mobile terminal, and the mobile terminal cannot be visually recognized.

For example, Japanese Patent Application Publication No. 2018-36974 discloses a method of a user visually recognizing an operation performed on a mobile terminal by preparing a virtual object mobile terminal in virtual space, and displaying information of an operation, which is performed on the real mobile terminal, upon this virtual object mobile terminal.

However, in MR in which images of the virtual world are superimposed on images of the real world, there are cases in which virtual objects are superimposed on real mobile terminals, and the mobile terminals cannot be visually recognized, and there are also cases where the mobile terminals are not superimposed and can be visually recognized. In an environment in which the real mobile terminals can be visually recognized, there is a possibility that displaying a virtual mobile terminal superimposed on the real mobile terminal will make intuitive operations difficult due to superimposing error.

Also, in a case of performing display without superimposing the virtual mobile terminal on the real mobile terminal, the virtual mobile terminal and the real mobile terminal may be displayed separately, and there is a possibility that this will impede immersivity. That is to say, displaying the virtual mobile terminal is not necessarily suitable.

SUMMARY OF THE INVENTION

The present disclosure proposes a technology for performing a suitable operation using a mobile terminal in an MR experience.

According to some embodiments, an information processing apparatus, includes a processor, and a memory storing a program which, when executed by the processor, causes the information processing apparatus to generate an image to be displayed on a display device that is mountable to a head of a user, decide an operation mode of an application, and accept an input operation from a mobile terminal that the user is capable of holding and operating, and perform an application operation on the basis of the operation mode and the input operation, wherein the program which, when executed by the processor, further causes the information processing apparatus to decide at least one of a first operation mode, in which the application operation is performed by the user operating the mobile terminal, and a second operation mode, in which a virtual user interface (UI) relating to an operation is displayed on the display device and the application operation is performed by the user operating the virtual UI, as the operation mode.

According to some embodiments, a control method of a computer includes generating an image to be displayed on a display device that is mountable to the head of a user, deciding an operation mode of an application, and accepting an input operation from a mobile terminal that the user is capable of holding and operating, and performing an application operation on the basis of the operation mode and the input operation, wherein in the deciding, at least one of a first operation mode, in which the application operation is performed by the user operating the mobile terminal, and a second operation mode, in which a virtual user interface (UI) relating to operation is displayed on the display device and the application operation is performed by the user operating the virtual UI, is decided as the operation mode.

According to some embodiments, a non-transitory computer readable medium that stores a program, wherein the program causes a computer to execute a control method of an information processing apparatus including generating an image to be displayed on a display device that is mountable to the head of a user, deciding an operation mode of an application, and accepting an input operation from a mobile terminal that the user is capable of holding and operating, and performing an application operation on the basis of the operation mode and the input operation, wherein in the deciding, at least one of a first operation mode, in which the application operation is performed by the user operating the mobile terminal, and a second operation mode, in which a virtual user interface (UI) relating to an operation is displayed on the display device and the application operation is performed by the user operating the virtual UI, is decided as the operation mode.

Further features of the present invention will become apparent from the following description of exemplary embodiments with reference to the attached drawings.

BRIEF DESCRIPTION OF THE DRAWINGS

FIGS. 3A to 3C are diagrams illustrating a specific example of a first operation mode according to the first embodiment;

FIGS. 4A and 4B are diagrams illustrating a specific example of a second operation mode according to the first embodiment;

FIGS. 10A and 10B are diagrams illustrating a specific example of a second operation mode according to the second embodiment;

FIG. 12 is a diagram illustrating a hardware configuration example of a mobile terminal.

DESCRIPTION OF THE EMBODIMENTS

Preferred embodiments of the present invention will be described below in detail, with reference to the attached drawings.

First Embodiment

An example will be given in a first embodiment in which an operation mode is decided in accordance with whether or not a mobile terminal can be visually recognized by a head-mounted display (HMD), and application operations are carried out to impart text to a virtual object on the basis of the operation mode.

Figure 1:
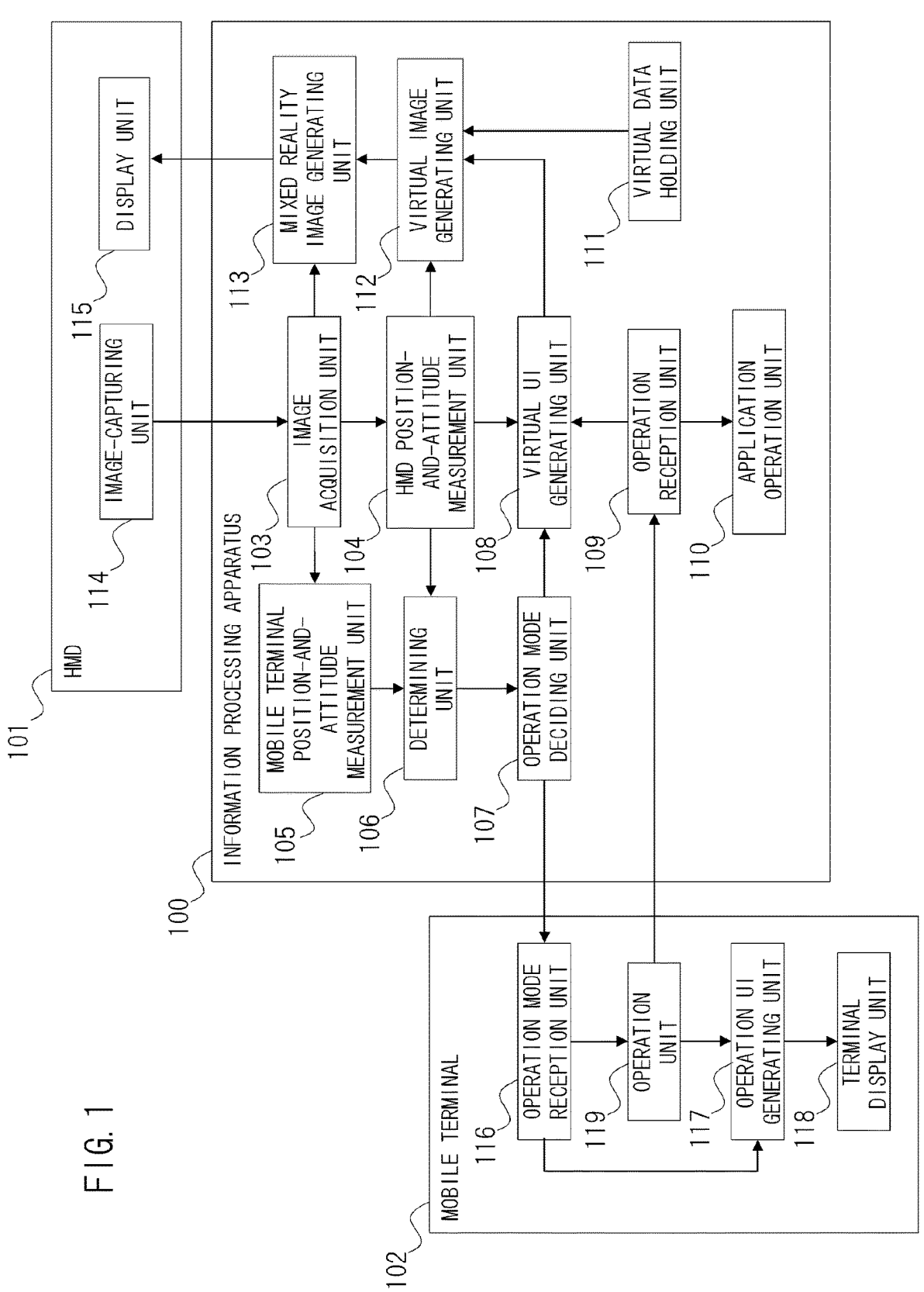
FIG. 1 is a block diagram illustrating a functional configuration example of a system according to a first embodiment.

(Configuration) FIG. 1 is a block diagram illustrating a configuration example of a system according to the present embodiment. The system according to the present embodiment is a configuration in which an information processing apparatus 100 is connected to an HMD 101 and a mobile terminal 102. The connection among the devices may be either wired or wireless. Further, connection among the devices may be realized by a combination of wired and wireless.

Figure 2:
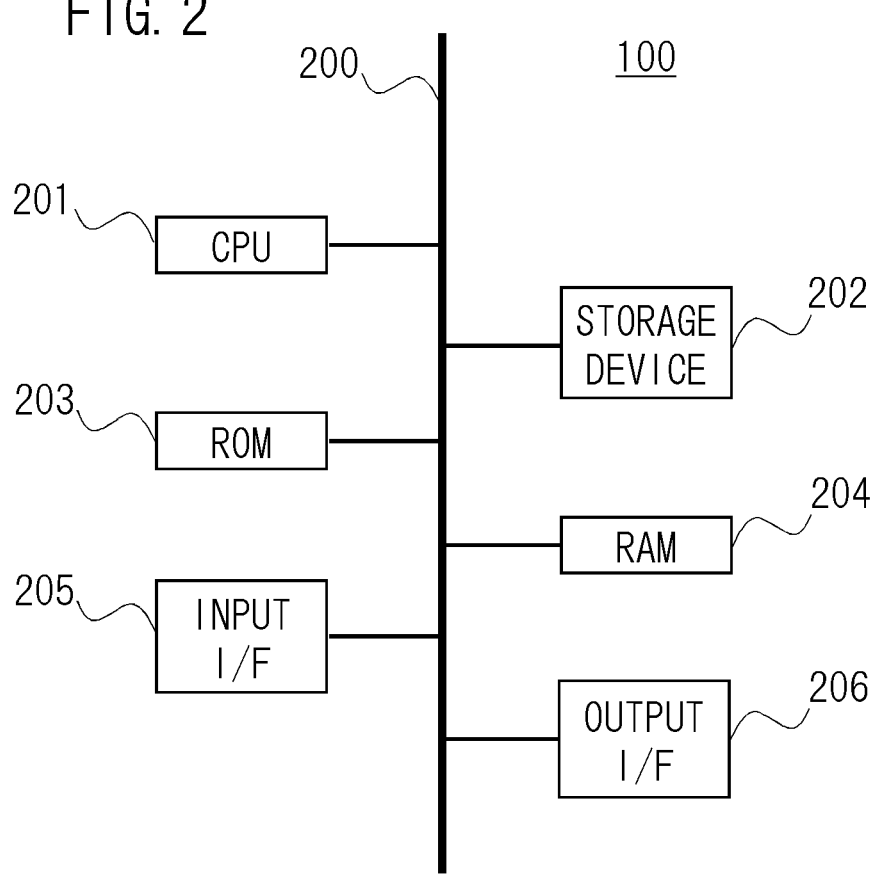
FIG. 2 is a diagram illustrating a hardware configuration example of an information processing apparatus.

(Information Processing Apparatus) First, the information processing apparatus 100 will be described. The information processing apparatus 100 accepts input operations from the mobile terminal 102, and is capable of application operations on the basis of the operation mode that is set, and input operations. FIG. 2 is a hardware configuration diagram of the information processing apparatus 100 in the present embodiment. As illustrated in FIG. 2, the information processing apparatus 100 has the same configuration of a known general-purpose computer, and includes a central processing unit (CPU) 201, a storage device 202, read-only memory (ROM) 203, random-access memory (204), an input interface 205, and an output interface 206.

The CPU 201 centrally controls the devices connected via a bus 200. The CPU 201 reads out and executes processing steps and computer programs stored in the ROM 203 and the RAM 204.

The storage device 202 stores programs and data used by the information processing apparatus 100, including various types of programs according to the present embodiment.

The ROM 203 stores an operating system (OS), as well as device drivers and boot programs.

The RAM 204 temporarily stores programs and data loaded from the storage device 202 and the ROM 203, and has a work area in which various types of processing are executed as appropriate by the CPU 201.

The input interface 205 inputs signals from external devices including the mobile terminal 102, as input signals of a format that is processable by the information processing apparatus 100.

The output interface 206 outputs signals to external devices including the HMD 101, as output signals of a format that is processable by the external devices.

The information processing apparatus 100 realizes the functions illustrated in FIG. 1 by the CPU 201 reading out and executing the programs.

An image acquisition unit 103 acquires images of the real world (real images) that are image-captured by an image-capturing unit 114 of the HMD 101. The image acquisition unit 103 outputs the acquired images to an HMD position-and-attitude measurement unit 104, a mobile terminal position-and-attitude measurement unit 105, and a mixed reality image generating unit 113.

The HMD position-and-attitude measurement unit 104 measures the position and attitude of the HMD 101 by performing image processing using real images (image-captured images) acquired by the image acquisition unit 103, and extracting feature information such as points, lines, and so forth, in the images. The position and attitude of the HMD 101 can be deemed to be equivalent to the line of view of a user, or the position and attitude of the head thereof. Position and attitude information measured by the HMD position-and-attitude measurement unit 104 is input to a determining unit 106, a virtual UI generating unit 108, and a virtual image generating unit 112.

Although the present embodiment employs position and attitude measurement by image processing, the present invention is not limited to this. The position and attitude of the HMD may be measured using infrared rays, or may be measured using at least one of an ultrasound sensor, a magnetic sensor, and a depth sensor.

The mobile terminal position-and-attitude measurement unit 105 measures the position and attitude of the mobile terminal 102 by performing image processing using real images acquired by the image acquisition unit 103. The position and attitude of the mobile terminal 102 can be measured by displaying an indicator (marker) dedicated for the mobile terminal on a terminal display unit 118 and estimating the position and attitude of the indicator displayed on a real image. The indicator here is not limited in particular, as long as it has a uniquely-identifiable shape.

Although position and attitude measurement of the mobile terminal 102 using the indicator is employed in the present embodiment, the present invention is not limited to this. The position and attitude of the mobile terminal 102 may be measured using infrared rays, or may be measured using at least one of an ultrasound sensor, a magnetic sensor, a depth sensor, and an angular velocity sensor. The position and attitude of the mobile terminal 102 may also be measured using the Global Positioning System (GPS).

The determining unit 106 determines whether or not the mobile terminal 102 can be visually recognized by the user via the HMD 101. The determining unit 106 performs this determination further taking into consideration the angle of view of the HMD 101 and the display size of the mobile terminal 102, on the basis of the position and attitude of the HMD 101 found by the HMD position-and-attitude measurement unit 104, and the position and attitude of the mobile terminal 102 found by the mobile terminal position-and-attitude measurement unit 105, for example. More specifically, the determining unit 106 determines whether or not the mobile terminal 102 can be visually recognized by the user via the HMD 101, in accordance with whether or not a display of the mobile terminal is within the angle of view of the HMD. The determining unit 106 inputs results of the determination to an operation mode deciding unit 107.

While determination is made regarding whether or not the mobile terminal 102 can be visually recognized by the user via the HMD 101 is made on the basis of the position and attitude of the HMD 101 and the mobile terminal 102 in the present embodiment, the present invention is not limited to this. The determining unit 106 may make the above determination by judging whether or not the mobile terminal is in the real image (image-captured image) acquired by the image acquisition unit 103, by image recognition. At this time, the determining unit 106 may determine whether or not the HMD 101 and the mobile terminal 102 are facing each other, in order to determine whether or not the display of the mobile terminal 102 is in the real image of the HMD 101. The determining unit 106 preferably adds, to the results of determination, whether or not the resolution is sufficient for the user to be able to visually recognize the display of the mobile terminal 102 in the real image on the HMD 101, when displaying the real image on the HMD 101. More preferably, the determining unit 106 preferably adds, to the results of determination, whether or not the resolution is sufficient for the user to be able to visually recognize on the HMD 101 not only the display of the mobile terminal 102 but the information displayed on this display. Further, the determining unit 106 may determine whether the mobile terminal 102 can be visually recognized in a mixed reality image displayed on the HMD 101. That is to say, in a mixed reality image in which virtual space images are superimposed on a real image, the determining unit 106 may determine whether or not a virtual object is rendered superimposed on a region of the mobile terminal 102 in the real image. When no virtual object is rendered superimposed on the region of the mobile terminal 102 in the real image, this means that the user can visually recognize the mobile terminal 102 in the mixed reality image without being blocked by a virtual object. In a case in which the resolution is sufficient for the user to be able to visually recognize the display of the mobile terminal 102, and further the information displayed on this display, the determining unit 106 determines that the user can visually recognize the mobile terminal 102 via the HMD 101. Also, when no virtual object is superimposed on the region of the mobile terminal 102 in the real image, and the user can visually recognize the mobile terminal 102 in the mixed reality image without being blocked by a virtual object, the determining unit 106 determines that the user can visually recognize the mobile terminal 102 via the HMD 101. Notwithstanding, the determining unit 106 may determine that the user can visually recognize the mobile terminal 102 via the HMD 101 when part of all of the conditions described above is satisfied.

The operation mode deciding unit 107 decides the operation mode for operating applications on the basis of the results of the determination by the determining unit 106. That is to say, in a case in which determination is made that the user can visually recognize the mobile terminal 102 via the HMD 101, the operation mode deciding unit 107 decides on a first operation mode in which the user directly operates the mobile terminal 102 to operate applications. Also, in a case in which determination is made that the user cannot visually recognize the mobile terminal 102, the operation mode deciding unit 107 decides on a second operation mode in which a virtual object for an operation user interface (UI) is displayed in virtual space (virtual UI), and the user operates this virtual UI, thereby operating the applications. The first operation mode and the second operation mode can also be expressed as being modes in which graphical user interfaces (GUI) displayed for operating applications differ from each other. GUIs differing from each other means that at least part of GUIs, including a GUI displayed on a display unit of the mobile terminal 102 and the virtual UI displayed on the HMD 101, differ. Even in a case in which determination is made that the user can visually recognize the mobile terminal 102 via the HMD 101, the operation mode deciding unit 107 may decide on the second operation mode for the operation mode in a case in which the direction of the line of view of the user is not directed toward the mobile terminal 102. The operation mode deciding unit 107 inputs the operation mode, which is decided upon, to the virtual UI generating unit 108 and an operation mode reception unit 116 of the mobile terminal 102. The operation mode deciding unit 107 that inputs the operation mode that is decided upon to the virtual UI generating unit 108 and the operation mode reception unit 116 corresponds to control means for controlling display of GUIs at the HMD 101 and the mobile terminal 102.

FIGS. 3A to 3C illustrate an example of the first operation mode, and FIGS. 4A and 4B illustrate an example of the second operation mode, when performing an operation of imparting text to a virtual object in the present embodiment.

First, the first operation mode will be described with reference to FIGS. 3A to 3C. FIG. 3A is a diagram illustrating a mixed reality (MR) space when in the first operation mode. A user 301 performs an experience in the MR space in which a virtual object 300 is present, using an HMD 302 mounted on the head, and a mobile terminal 303 serving as a controller, that is held. FIG. 3B is a mixed reality image displayed on the HMD 302 in FIG. 3A. The mixed reality image is an image in which the virtual object 300 is superimposed on the real image including the mobile terminal 303. Displayed on a display unit of this mobile terminal 303 are an indicator 304 for the information processing apparatus 100 to measure the position and attitude of the mobile terminal 303, and a keyboard 305 that is a GUI for the user to perform text imparting operations, as illustrated in FIG. 3C. The user imparts text to the virtual object 300 by operating the keyboard 305.

Next, the second operation mode will be described with reference to FIGS. 4A and 4B. Configurations that are the same as in FIGS. 3A to 3C are denoted by the same signs, and description thereof will be omitted. FIG. 4A is a diagram illustrating the MR space when in the second operation mode. FIG. 4A illustrates a state in which the user 301 is not visually recognizing the mobile terminal 303, unlike in FIG. 3A. In the second operation mode, a virtual keyboard 400 serving as a virtual UI, and a pointer 401 for performing key selection, are placed so that the user 301 can impart text without using the mobile terminal 303. FIG. 4B is a mixed reality image displayed on the HMD 302 in FIG. 4A. The mixed reality image is an image in which the virtual object 300, the virtual keyboard 400, and the pointer 401 are superimposed on a real image. The user moves the pointer 401 by operating the mobile terminal 303, and inputs a key that is focused on by the pointer 401 by performing a deciding operation, thereby imparting text to the virtual object 300. Operation of the virtual UI may be performed by operations other than the user operating the mobile terminal 303. For example, operation of the virtual UI may be realized on the basis of the position and attitude of at least part of the body of the user, such as the fingers, the head, the line of view, or the like, or the position and attitude of the mobile terminal 102. Measurement of the position and attitude of the body of the user can be realized by performing image recognition processing on real images that are image-captured by the HMD 101.

The virtual UI generating unit 108 generates the virtual UI in a case in which the operation mode input from the operation mode deciding unit 107 is the second operation mode, and the virtual UI generating unit 108 does not generate the virtual UI in a case in which the operation mode is the first operation mode. The virtual UI includes a graphics object (virtual object) made up of a GUI, such as buttons of the virtual keyboard 400 in FIG. 4B, or the like. The virtual UI further includes a pointing object that is a virtual object for performing selection operations or deciding operations, such as the pointer 401.

While selection and deciding operations using the pointer 401 are employed in the present embodiment, the present invention is not limited to these, as long as selection and deciding operations of virtual objects can be performed. Selection and deciding operations of virtual objects may be performed by casting of a ray displayed on the basis of the position and attitude of the mobile terminal, for example. The graphics object may be placed at a position and attitude displayed on the HMD 101, in accordance with the position and attitude input from the HMD position-and-attitude measurement unit 104. For example, a technology is conceivable in which, as described in Japanese Patent Application Publication No. 2019-32713, frustums are calculated for the HMD 101, and placement is performed so as to be perpendicular to the direction of the line of view in an overlapping region of the frustums of the left eye and the right eye. Alternatively, placement of the graphics object may be performed at a position and attitude relative to a virtual object that is the object of operation.

The position and attitude of the pointing object is decided in accordance with selection operations input from an operation reception unit 109. Details will be described later by way of flowchart. The virtual UI generating unit 108 inputs the generated virtual UI to the virtual image generating unit 112.

The operation reception unit 109 receives operation signals of the mobile terminal 102 from an operation unit 119 of the mobile terminal 102. Operation signals will be described with regard to the operation unit 119, which will be described later. The operation reception unit 109 interprets these operation signals, and converts the operations signals into operation events such as selection operations and deciding operations. In a case in which a deciding operation is input, the operation reception unit 109 makes notification thereof to an application operation unit 110. Also, in a case of the second operation mode, the operation reception unit 109 inputs an operation event to the virtual UI generating unit 108.

The application operation unit 110 accepts input operations from the mobile terminal 102 via the operation reception unit 109, and performs application operations on the basis of the operation mode that is currently set and the input operations that are accepted. In the first operation mode, the application operation unit 110 performs application operations on the basis of input operations using the GUI displayed on the mobile terminal 102. Also, in the second operation mode, the application operation unit 110 performs application operations on the basis of input operations using the GUI including the virtual UI displayed on the HMD 101.

A virtual data holding unit 111 holds data of the virtual space, such as data relating to virtual objects making up the virtual space (shape information and position-and-attitude information), data relating to light sources illuminating the virtual space, and so forth, which are input to the virtual image generating unit 112.

The virtual image generating unit 112 makes up the virtual space from the virtual UI generated by the virtual UI generating unit 108 and the virtual objects acquired from the virtual data holding unit 111. The virtual image generating unit 112 further generates images in the virtual space (virtual images) that are visible from the position and attitude measured by the HMD position-and-attitude measurement unit 104. The virtual image generating unit 112 inputs the generated virtual images to the mixed reality image generating unit 113. Note that the technology of generating images of a virtual space that are visible from a certain position is known technology, and accordingly detailed description thereof will be omitted.

The mixed reality image generating unit 113 generates images to be displayed on the HMD 101. More specifically, the mixed reality image generating unit 113 superimposes the virtual images generated by the virtual image generating unit 112 on the real image acquired by the image acquisition unit 103, thereby generating an image of the mixed reality space (mixed reality image). The mixed reality image generating unit 113 outputs the mixed reality image that is generated to a display unit 115 of the HMD 101.

The mixed reality image generating unit 113 corresponds to image generating means for generating images to display on the HMD 101. Note that the image generating means may be means for instructing other devices or application modules to generate images to be displayed on the HMD 101. For example, in a case in which the virtual image generating unit 112 and the mixed reality image generating unit 113 are realized by a device or module different from the information processing apparatus 100, the information processing apparatus 100 may instruct the virtual image generating unit 112 and the mixed reality image generating unit 113 to generate mixed reality images. In this case, the information processing apparatus outputting this instruction can be interpreted to correspond to the image generating means.

(HMD) Next, the HMD 101 will be described.

The HMD 101 is a display device that has a display unit made up of a liquid crystal display or the like, and that is mountable on the head of the user. The HMD 101 has a display unit for the right eye and a display unit for the left eye, which are attached so as to be positioned in front of the right eye and the left eye of the user, respectively, when the user mounts the HMD 101 on the head. Also, stereo display of images with disparity as to each other is performed at the left and right display units (screens). In the present embodiment, the HMD 101 will be described as a video see-through type HMD that displays mixed reality images generated on the basis of real images image-captured by the image-capturing device on a display device. However, the present invention is not limited to this. The HMD 101 may be an optical see-through type of HMD that displays virtual space images superimposed on a display medium by which the real space can be observed through.

The image-capturing unit 114 performs image-capturing of the real space to be displayed on the HMD 101, and inputs the image-captured real images to the information processing apparatus 100.

The display unit 115 displays mixed reality images generated by the information processing apparatus 100.

(Mobile Terminal) The mobile terminal 102 will be described. The mobile terminal 102 is used as a controller that the user can hold and operate. The mobile terminal is a general-purpose one, indicating a smartphone or a tablet terminal. FIG. 12 is a hardware configuration diagram of the mobile terminal 102 according to the present embodiment.

A CPU 1201 centrally controls devices connected thereto via a bus 1200. The CPU 1201 reads out and executes processing steps and programs stored in ROM 1203 and RAM 1204.

A storage device 1202 stores programs and data used by the mobile terminal 102, including various types of programs according to the present embodiment.

The ROM 1203 stores an operating system (OS), as well as device drivers and boot programs.

The RAM 1204 temporarily stores programs and data loaded from the storage device 1202 and the ROM 1203, and has a work area in which various types of processing are executed as appropriate by the CPU 1201.

An input device 1205 is a device for giving data, information, instructions, and so forth, examples of which include an internal measurement unit (IMU), a touch panel, a microphone, or the like which are built in. Input, obtained by these, is input as input signals in a format that is processable.

An output device 1206 is a device that receives output signals for physical presentation thereof. Examples include a display, a speaker, and a vibrator.

Functions of the mobile terminal 102 that relate to the present embodiment will be described below.

The operation mode reception unit 116 receives the operation mode from the operation mode deciding unit 107 of the information processing apparatus 100, and performs input thereof to the operation unit 119. In a case of the first operation mode, the operation mode reception unit 116 also inputs the operation mode to the operation UI generating unit 117.

In a case in which the operation mode received from the operation mode reception unit 116 is the first operation mode, the operation UI generating unit 117 generates a GUI for performing application operations. The operation UI generating unit 117 inputs the generated GUI to the terminal display unit 118.

The terminal display unit 118 displays the UI generated by the operation UI generating unit 117. The terminal display unit 118 is provided on the front side of the mobile terminal 102, and is made up of a display that is capable of display, such as a liquid crystal display or the like.

The operation unit 119 inputs operation signals corresponding to input operations performed on the mobile terminal to the operation UI generating unit 117, or the operation reception unit 109 of the information processing apparatus 100. The input operations include touch gestures such as tapping operations or swiping operations performed on a touch panel, and back tapping that is detected on the basis of angular acceleration measured by a built-in IMU. In a case of touch gestures, operation signals are generated on the basis of at least one of the position of the touch, the distance of movement, and the direction of movement. Further, the position and attitude (position and orientation, and change thereof) of the mobile terminal 102, acquired by the IMU in accordance with input operations consisting of moving the mobile terminal 102, may be used as operation signals.

First, the behavior of the operation unit 119 will be described in a case in which the operation mode is the first operation mode.

In a case in which an operation performed with respect to an application by a deciding operation is an input operation, the operation unit 119 inputs an operation signal, based on the UI that is focused on, to the operation reception unit 109.

In a case in which the input operation is a moving or a switching operation with respect to the UI, the operation unit 119 may send an operation signal to the operation UI generating unit 117 and update the operation UI. Swiping operations and dragging operations with respect to the touch panel of the mobile terminal 102 are conceivable as moving or switching operations, and further may be attitude change of the mobile terminal 102. Tapping operations with respect to the touch panel of the mobile terminal are conceivable as deciding operations.

Next, the behavior of the operation unit 119 in a case in which the operation mode is the second operation mode will be described.

The operation unit 119 inputs operation signals to the operation reception unit 109, regardless of the type of operations, such as whether the input operations are moving or switching operations, deciding operations, or the like.

Figure 5:
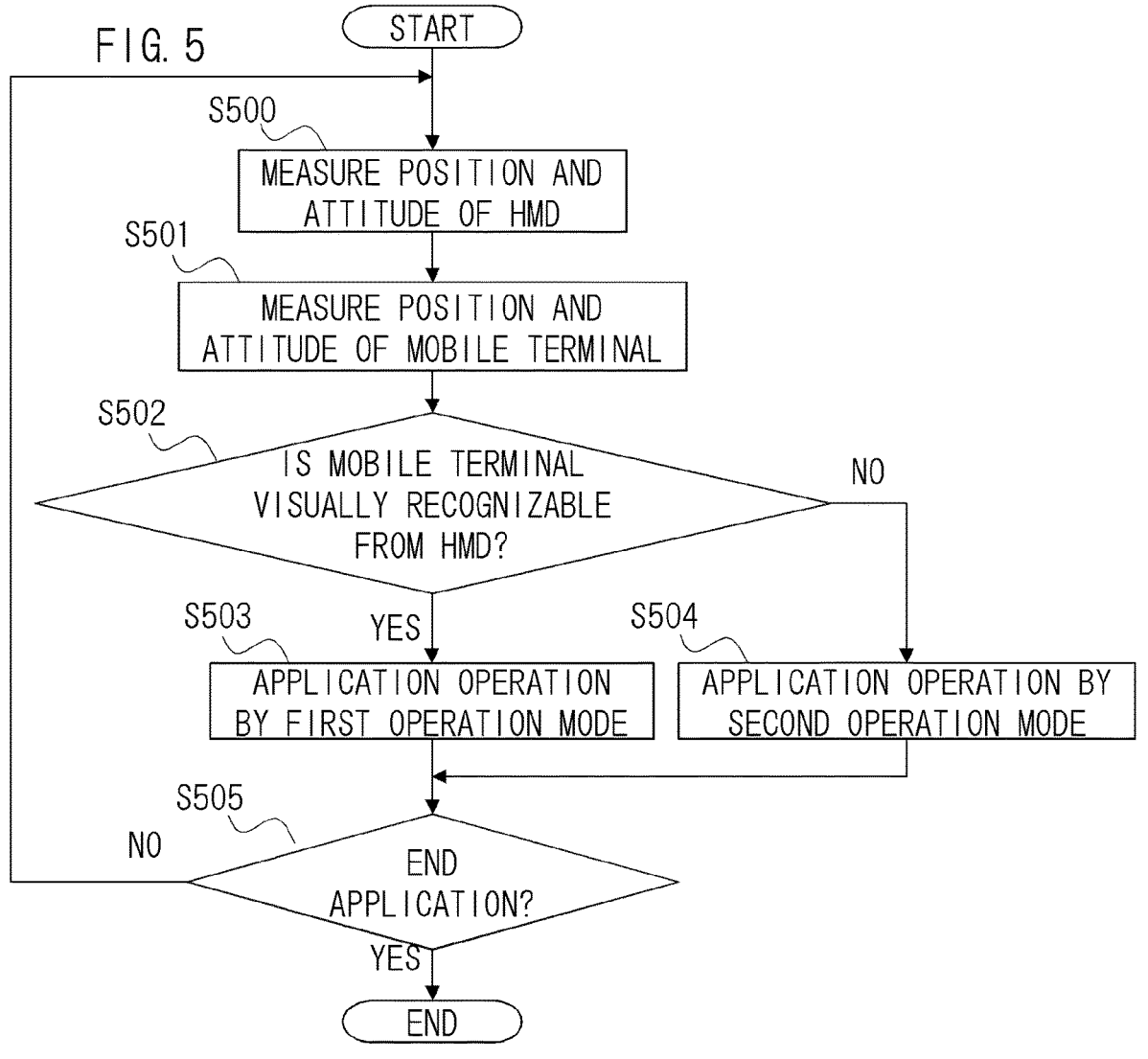
FIG. 5 is a flowchart of application operations according to the first embodiment.

(Processing) FIG. 5 is an example of a flowchart of deciding the operation mode, and performing operation of an application. Hereinafter, the processes (steps) will be described with an "S" preceding the signs thereof.

First, in step S500, the HMD position-and-attitude measurement unit 104 measures the position and attitude of the HMD 101 on the basis of an image-captured image acquired from the image acquisition unit 103. The processing then transitions to step S501.

In step S501, the mobile terminal position-and-attitude measurement unit 105 measures the position and attitude of the mobile terminal 102 on the basis of an image-captured image acquired from the image acquisition unit 103. The processing then transitions to step S502.

In step S502, the determining unit 106 determines whether or not the mobile terminal 102 is visually recognizable from the HMD 101. In a case of being visually recognizable, the processing transitions to step S503, and in a case of not being visually recognizable, the processing transitions to step S504.

In step S503, application operations in accordance with the first operation mode are performed. Details will be described later by way of flowchart. The processing then transitions to step S505.

In step S504, application operations in accordance with the second operation mode are performed. Details will be described later by way of flowchart. The processing then transitions to step S505.

In step S505, in a case in which an end instruction regarding the application is input by the user, or conditions for ending the application are satisfied, this processing ends. Conversely, in a case in which no end instruction regarding the application is input, and conditions for ending the application are not satisfied, the processing returns to step S500.

Figure 6:
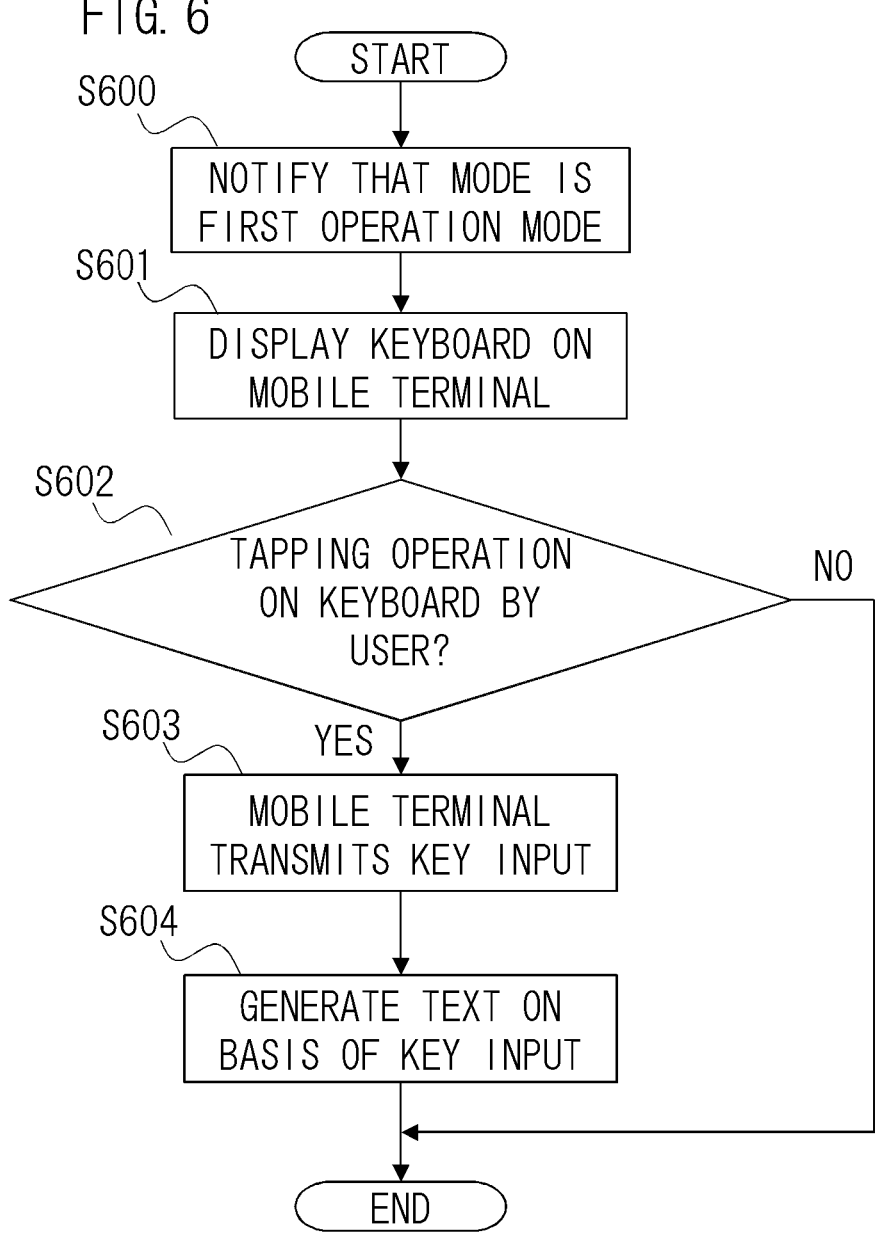
FIG. 6 is a flowchart of application operations in the first operation mode according to the first embodiment.

(First Operation Mode) FIG. 6 is a flowchart of application operations in accordance with the first operation mode indicated in step S503.

In step S600, the operation mode deciding unit 107 performs transmission to the operation mode reception unit 116 to the effect that the operation mode is the first operation mode. The processing then transitions to step S601.

In step S601, the operation mode reception unit 116 notifies the operation UI generating unit 117 that the operation mode is the first operation mode. Upon receiving this notification, the operation UI generating unit 117 generates the keyboard 305 such as illustrated in FIG. 3C, which is displayed on the terminal display unit 118 of the mobile terminal 102. The processing then transitions to step S602.

In step S602, the operation unit 119 receives whether or not the user has performed a tapping operation with respect to the keyboard 305 displayed on the mobile terminal 102. In a case in which the tapping operation is received, the processing transitions to step S603. In a case in which no tapping operation is received, the processing transitions to step S505.

In step S603, the operation unit 119 transmits a key input signal, corresponding to the key regarding which the tapping operation is performed, to the operation reception unit 109. The processing then transitions to step S604.

In step S604, the operation reception unit 109 notifies the application operation unit 110 that this key has been input, on the basis of the key input signal that is received. The application operation unit 110 generates text of this key with a virtual object, which is then placed in the virtual space. Accordingly, a virtual image including the text is generated by the virtual image generating unit 112, and this is superimposed on a real image by the mixed reality image generating unit 113, whereby text can be imparted. The processing then transitions to step S505.

In the present embodiment, upon receiving the notification that the operation mode is the first operation mode, the operation UI is displayed on the display unit of the mobile terminal 102, but the present invention is not limited thereto. For example, an arrangement may be made in which the operation UI is constantly displayed on the display unit of the mobile terminal 102 regardless of the operation mode, and accepts input only when in the first operation mode.

Accordingly, application operations can be performed by input operations to the mobile terminal 102.

Figure 7:
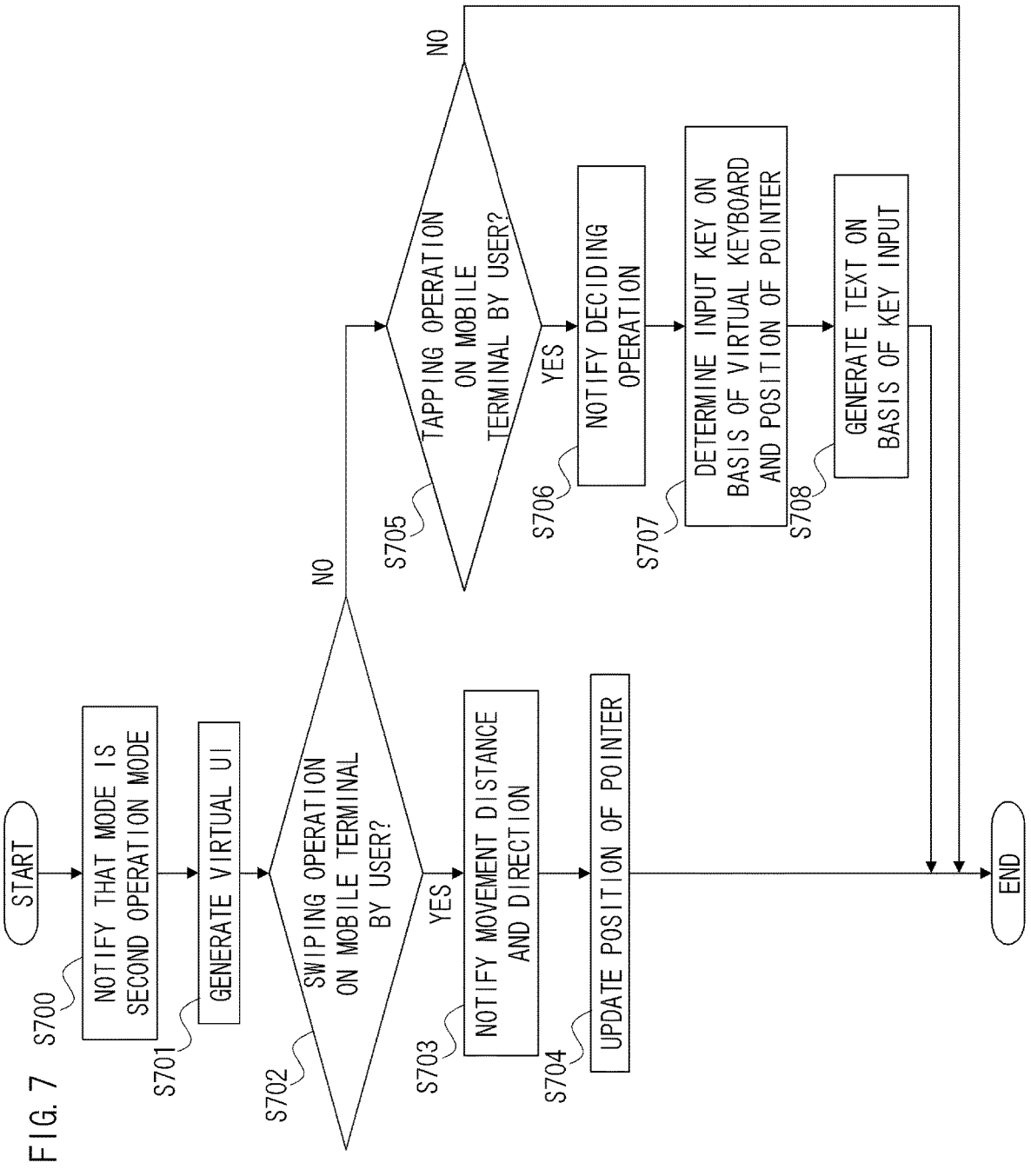
FIG. 7 is a flowchart of application operations in the second operation mode according to the first embodiment.

(Second Operation Mode) FIG. 7 is a flowchart of application operations in accordance with the second operation mode indicated in step S504.

In step S700, the operation mode deciding unit 107 performs transmission to the virtual UI generating unit 108 and the operation mode reception unit 116 to the effect that the operation mode is the second operation mode. The processing then transitions to step S701.

In step S701, the operation mode reception unit 116 notifies the virtual UI generating unit 108 to the effect that the operation mode is the second operation mode. Upon receiving this notification, the virtual UI generating unit 108 generates the virtual keyboard 400 and the pointer 401 such as illustrated in FIGS. 4A and 4B, which are placed in the virtual space. The virtual UI generating unit 108 inputs the results of this placement to the virtual image generating unit 112. The processing then transitions to step S702.

In step S702, the operation mode reception unit 116 notifies the operation unit 119 to the effect that the operation mode is the second operation mode. The operation unit 119 determines whether or not the user has performed a swiping operation with respect to the touch panel of the mobile terminal. In a case in which a swiping operation is received, the processing transitions to step S703. In a case in which no swiping operation is received, the processing transitions to step S705.

In step S703, the operation unit 119 notifies the operation reception unit 109 of the distance and direction of the finger moving over the screen by the swiping operation, as a moving operation signal. The processing then transitions to step S704. Although a method of obtaining the moving operation signal by a swiping operation performed on the mobile terminal 102 is described in the present embodiment, the present invention is not limited to this. The moving operation signal may be obtained by a flicking operation performed on the mobile terminal 102, or may be acquired on the basis of the amount of change of attitude of the mobile terminal.

In step S704, the operation reception unit 109 notifies the virtual UI generating unit 108 of the distance of movement and direction thereof that is received. The virtual UI generating unit 108 changes the position of the pointer 401 on the basis of the distance of movement and direction thereof that is acquired. The processing then transitions to step S505. Thus, the key of focus in the virtual keyboard 400 can be changed.

In step S705, the operation unit 119 determines whether or not the user has performed a tapping operation with respect to the touch panel of the mobile terminal 102. In a case in which a tapping operation is received, the processing transitions to step S706. In a case in which no tapping operation is received, the processing transitions to step S505.

In step S706, the operation unit 119 notifies the operation reception unit 109 that a deciding operation has been performed, as an operation signal. The processing then transitions to step S707.

In step S707, the operation reception unit 109 notifies the application operation unit 110 to the effect that a deciding operation has been performed. The application operation unit 110 determines the key that is focused on, on the basis of the position and attitude of the pointer 401 with respect to the virtual keyboard 400 generated by the virtual UI generating unit 108, and sets this key as an input key. The processing then transitions to step S708.

In step S708, the application operation unit 110 generates text of the key corresponding to the input key with a virtual object, which is then placed in the virtual space. Accordingly, a virtual image including the text is generated by the virtual image generating unit 112, and this is superimposed on a real image by the mixed reality image generating unit 113, whereby text can be imparted. The processing then transitions to step S505.

Thus, application operations can be performed by input operations with respect to the mobile terminal being reflected in the virtual UI.

(Advantageous Effects of Present Embodiment) According to the present embodiment, application operations based on the UI displayed on the display of the mobile terminal can be performed when the mobile terminal is visually recognizable, and application operations can be performed on the basis of the UI displayed in the virtual space when the mobile terminal is not visually recognizable. Accordingly, this enables suitable application operations in an MR experience.

First Modification

An example has been described in the first embodiment in which whether or not the mobile terminal 102 is visually recognizable by the HMD 101 is determined each time the positions and attitudes of the HMD 101 and the mobile terminal 102 are measured, and the operation mode is decided on the basis of the results of this determination and application operations are performed accordingly, but the preset invention is not limited to this. Once operations based on the operation mode that is decided is started, the operation mode does not have to be changed until the same operation is completed or cancelled, regardless of the positions and attitudes of the HMD 101 and the mobile terminal 102. That is to say, a time at which a key is input in the first operation mode or the second operation mode is taken as an operation start, and thereafter the operation mode does not have to be changed until text generation created by a plurality of key inputs is finalized, or generation thereof is cancelled.

Second Modification

An example has been described in the first embodiment in which whether or not the mobile terminal 102 is visually recognizable by the HMD 101 is determined, and the operation mode is decided on the basis of the results of this determination and application operations are performed accordingly, but the preset invention is not limited to this. The operation mode may be decided on the basis of input by the user. Input by the user can be performed by operating the mobile terminal. Also, input by the user may be performed by a UI and a mouse, or may be performed by a button-type device such as a keyboard or the like. Further, input by the user may be performed by gestures of the user being recognized, or by voice being recognized. In a case of using gestures and voice for input, the mobile terminal 102 needs to be configured so as to be capable of recognizing each of touch gestures and voice.

Third Modification

An example has been described in the first embodiment in which the operation mode is exclusively decided by the operation mode deciding unit 107, but the present invention is not limited to this. An operation mode may be employed in which both the first operation mode and the second operation mode are used. In the present modification, the virtual UI is displayed regardless of whether or not the mobile terminal 102 is visually recognizable, and application operations by the virtual UI are constantly enabled, for example. Further, in the present modification, in a case in which the mobile terminal 102 is visually recognizable, application operations can be performed by operating the mobile terminal 102. In other words, in the present modification, in a case in which the mobile terminal 102 is visually recognizable, both of the first operation mode and the second operation mode are enabled, and in a case in which the mobile terminal 102 is not visually recognizable, the second operation mode is enabled.

Realizing both of the first operation mode and the second operation mode can be realized by the information processing apparatus 100 performing processing such as follows.

The information processing apparatus 100 instructs the virtual UI generating unit 108 to generate a GUI including a virtual UI and to perform display thereof on the HMD 101, and also notifies the operation mode reception unit 116 of the mobile terminal 102 regarding the operation mode and performs instruction thereto to display a GUI on the mobile terminal 102. The information processing apparatus 100 effects control such that the display of the GUI including the virtual UI on the HMD 101, and the display of the GUI on the mobile terminal 102, are performed simultaneously. Note that the phrase to be simultaneously displayed is not limited to meaning that the display start is simultaneously, but rather means that the GUI is displayed on both the HMD 101 and the mobile terminal 102 in at least a certain period.

The information processing apparatus 100 first measures the position and attitude of the fingers of the user by a measurement unit that is omitted from illustration, and inputs the results of the measurement to the operation reception unit 109. The operation reception unit 109 determines whether or not the fingers and the GUI are intersecting, from the position and attitude of the fingers of the user from the measurement unit, and the position and attitude of the GUI included in the virtual UI that is generated. In a case of intersecting, the operation reception unit 109 inputs an operation signal to the application operation unit 110 since a deciding operation has been input. Conversely, in a case of not intersecting, the operation reception unit 109 judges that no input operation is being performed by the user, and does not input an operation signal to the application operation unit 110. Also, the operation reception unit 109 performs notification to the application operation unit 110 with respect to the input signal sent from the operation unit 119 of the mobile terminal 102.

Thus, performing application operations by operating a virtual UI by the fingers of the user, and performing application operations by operating the mobile terminal, can both be realized. That is to say, the information processing apparatus 100 can perform application operations on the basis of at least one of operations performed with respect to the GUI including the virtual UI, and operations performed with respect to the GUI of the mobile terminal 102.

While an example of performing operations of the virtual UI using fingers of the user has been described as the second operation mode in the present embodiment, the present invention is not limited to this. In the second operation mode, operations may be performed using the line of view of the user, or operations may be performed by voice.

In the present modification, the operation mode is switched in accordance with whether or not the user can visually recognize the mobile terminal 102, but the first operation mode and the second operation mode may be constantly enabled regardless of whether or not the user can visually recognize the mobile terminal 102. Alternatively, an arrangement may be made in which the user can set whether or not to realize both the first operation mode and the second operation mode, and the operation mode deciding unit 107 decides the operation mode on the basis of these settings. That is to say, in a case in which realizing both operation modes is set, the operation mode deciding unit 107 decides both of the first operation mode and the second operation mode to be the operation mode, and decides the operation mode in accordance with whether or not the user can visually recognize the mobile terminal 102 in a case in which realizing both operation modes is not set.

Fourth Modification

The functional configurations of the information processing apparatus 100, the HMD 101, and the mobile terminal 102 described in the first embodiment are only exemplary. Some of the functions may be executed by a device that is different from the devices described above, and may be executed in a manner distributed among a plurality of devices. For example, the information processing apparatus 100 may be made up of a plurality of information processing apparatuses, not being limited to a single apparatus. Also, functions described as being functions of the information processing apparatus 100 such as the operation mode deciding unit 107 for example, may be executed by the HMD 101 or the mobile terminal 102.

Second Embodiment

Although a case is described in the first embodiment in which the same application operations of text imparting operations by keyboard is performed regardless of the operation mode, a case in which the application operations that can be executed differ depending on the operation mode will be described in a second embodiment.

In a case of handling 3D computer graphics (3DCG), the following two UIs are commonly configured, as in digital content creation (DCC) tools. First, there are UIs by which accurate operations or detailed operations are performed by two-dimensional UIs, such as tree displays or property displays. Next, there are UIs by which three-dimensional space is displayed and intuitive operations are performed with respect to space by three-dimensional UIs such as a dragger or the like. Similar UIs are preferably provided in XR in which 3DCGs are handled.

The first operation mode in which application operations are performed visually recognizing the mobile terminal by the HMD can be said to be well-suited for accurate operations and detailed operations performed by two-dimensional UIs. Also, the second operation mode in which application operations are performed by three-dimensional UIs displayed in XR space can be said to be well-suited for spatial or intuitive operations.

In the present embodiment, a case of performing application operations for changing placement of a virtual object will be described. Note that the configurations of the information processing apparatus 100, the HMD 101, and the mobile terminal 102 (FIGS. 1, 2, and 12) according to the present embodiment are the same as in the first embodiment, and accordingly description will be omitted.

Figure 8A:
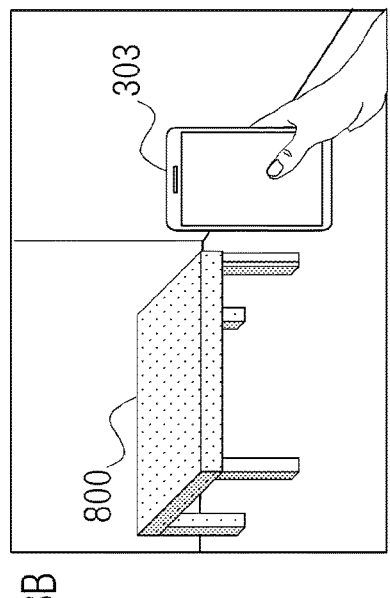
FIGS. 8A to 8C are diagrams illustrating a specific example of a first operation mode according to a second embodiment.
Figure 8B:
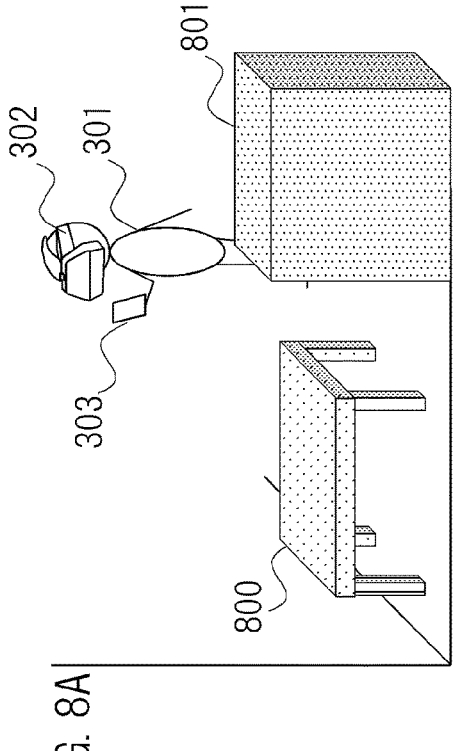
Figure 8C:
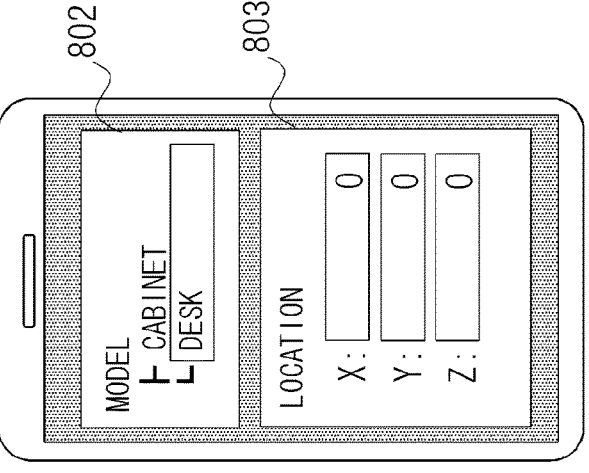

An example of changing placement of a virtual object by the first operation mode will be described first, with reference to FIGS. 8A to 8C. Configurations that are the same as in FIGS. 3A to 3C are denoted by the same signs, and description thereof will be omitted. FIG. 8A is a diagram illustrating MR space in the first operation mode. A desk 800 that is a virtual object, and a cabinet 801 that is a virtual object, are placed in the MR space. FIG. 8B is a mixed reality image that is visible on the HMD 302 in FIG. 8A. The mixed reality image includes the mobile terminal 303. A two-dimensional UI for performing operations, such as illustrated in FIG. 8C, is displayed on the display unit of this mobile terminal 303. This two-dimensional UI includes a tree UI 802 that displays a list of virtual objects placed in the MR space, in a tree format, and a property UI 803 that displays detailed settings of the virtual object selected in the tree UI. The user can change the placement of the virtual object by selecting the virtual object to be moved from the tree UI 802, and inputting the position and attitude to the property UI 803 in numerical values.

Figure 9:
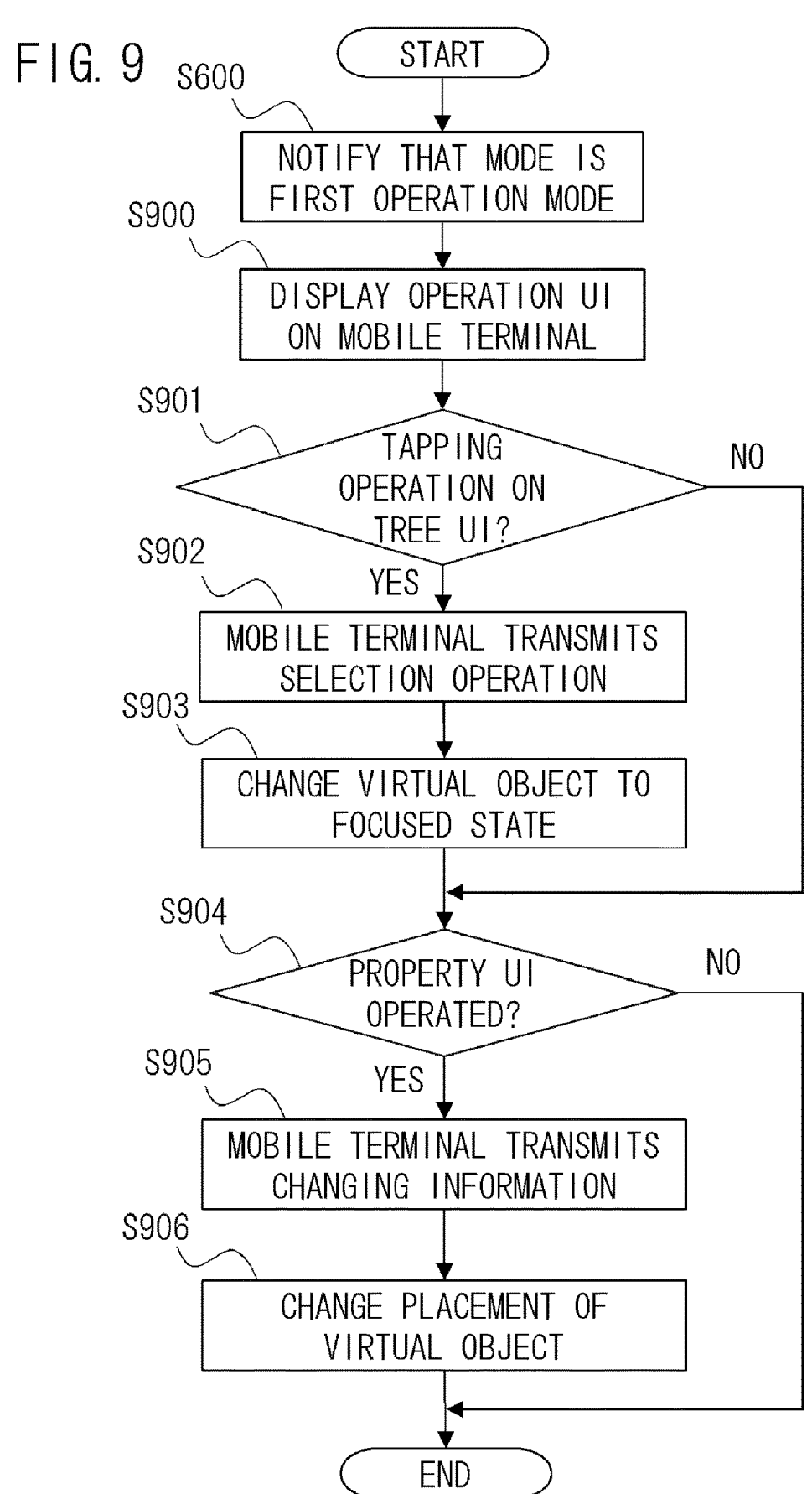
FIG. 9 is a flowchart of application operations in the first operation mode according to the second embodiment.

FIG. 9 is a flowchart of processing in step S503 for performing application operations to change the placement of a virtual object in the first operation mode. Processing that is the same as in FIG. 6 is denoted by the same signs, and description thereof will be omitted.

In step S900, the operation mode reception unit 116 notifies the operation UI generating unit 117 that the operation mode is the first operation mode. Upon receiving the notification, the operation UI generating unit 117 generates the tree UI 802 and the property UI 803 such as illustrated in FIG. 8C, and performs display thereof on the terminal display unit 118 of the mobile terminal 102. The processing then transitions to step S901.

In step S901, the operation unit 119 receives whether or not the user has performed a tapping operation with respect to the tree UI 802 displayed on the mobile terminal 102. In a case in which a tapping operation is received, the processing transitions to step S902. In a case in which no tapping operation is received, the processing transitions to step S904.

In step S902, the operation unit 119 transmits information of the virtual object selected at the tree UI 802 to the operation UI generating unit 117 and the operation reception unit 109. For example, the operation unit 119 performs transmission to the effect that the desk 800 has been selected, to the operation UI generating unit 117 and the operation reception unit 109. The operation UI generating unit 117 displays detailed settings of the virtual object that has been selected in the property UI 803. The processing then transitions to step S903.

In step S903, the operation reception unit 109 notifies the application operation unit 110 of the information of the virtual object that has been selected. The application operation unit 110 updates the virtual space such that it becomes clear that the relevant virtual object is selected. The fact that the virtual object is selected may be indicated by displaying a bounding box about the virtual object, or may be indicated by changing the color of the virtual object. The processing then transitions to step S904.

In step S904, the operation unit 119 receives whether or not the user has performed changing operations with respect on the property UI 803 displayed on the mobile terminal. The changing operations according to the present embodiment are operations for changing numerical values indicating the position of the virtual object. In a case in which changing operations are received, the processing transitions to step S905. In a case in which no changing operations are received, the processing transitions to step S505.

In step S905, the operation unit 119 transmits the changing information of the selected virtual object to the operation reception unit 109. The processing then transitions to step S906.

In step S906, the operation reception unit 109 performs notification of the changing information of the virtual object that has been selected to the application operation unit 110. The application operation unit 110 changes the placement of the relevant virtual object in the virtual space, on the basis of the changing information. Accordingly, a virtual image is generated by the virtual image generating unit 112 in a state in which the placement of the virtual object is changed, and the change in placement of the virtual object can be realized by superimposing the generated virtual image on the real image by the mixed reality image generating unit 113.

Figures 10A, 10B:
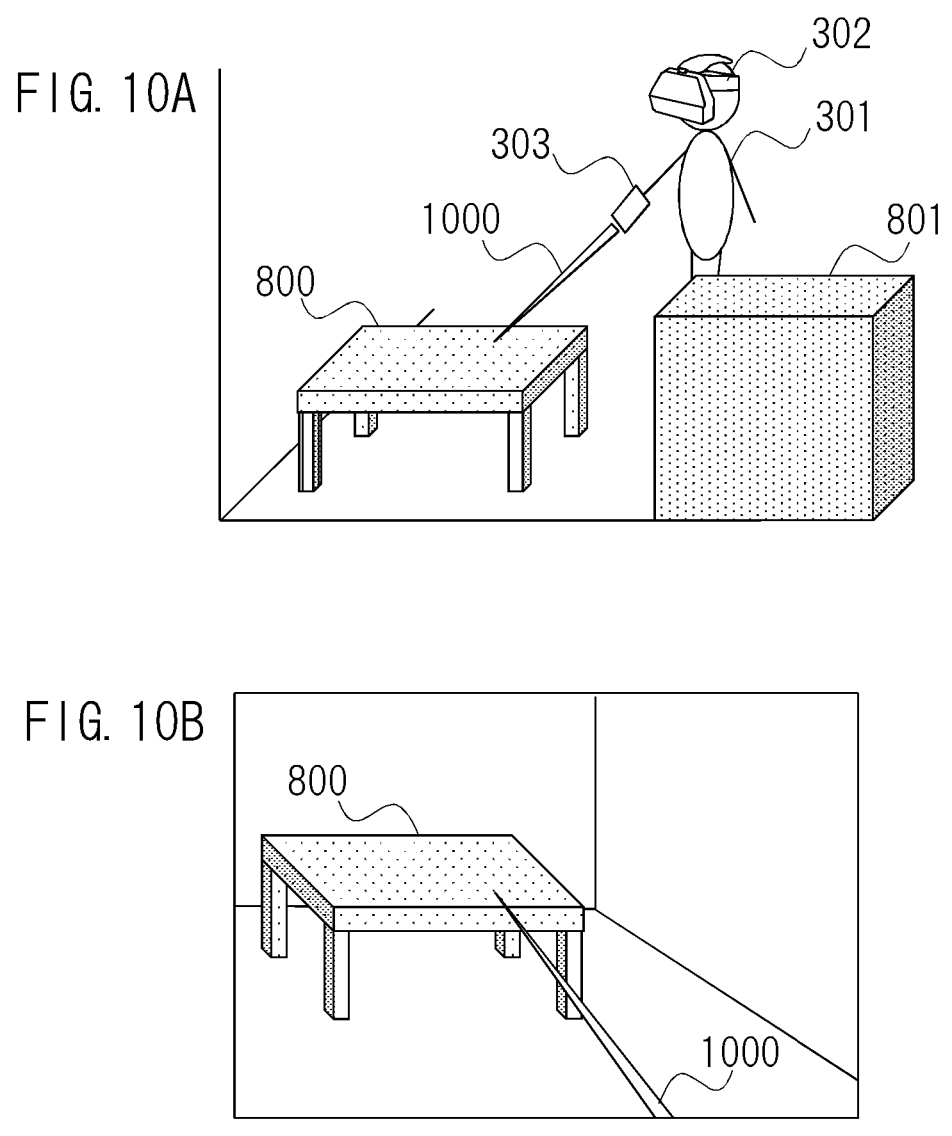

Next, an example of changing placement of a virtual object by the second operation mode will be described, with reference to FIGS. 10A and 10B.

Configurations that are the same as in FIGS. 8A and 8B are denoted by the same signs, and description thereof will be omitted. FIG. 10A is a diagram illustrating MR space in the second operation mode. A ray 1000 that is a pointing object is placed on the basis of the position and attitude of the mobile terminal 303. FIG. 10B is a mixed reality image that is visible on the HMD 302 in FIG. 10A. The placement of the virtual object can be changed by performing selecting and moving operations of the virtual object pointed to by the ray 1000.

Figure 11:
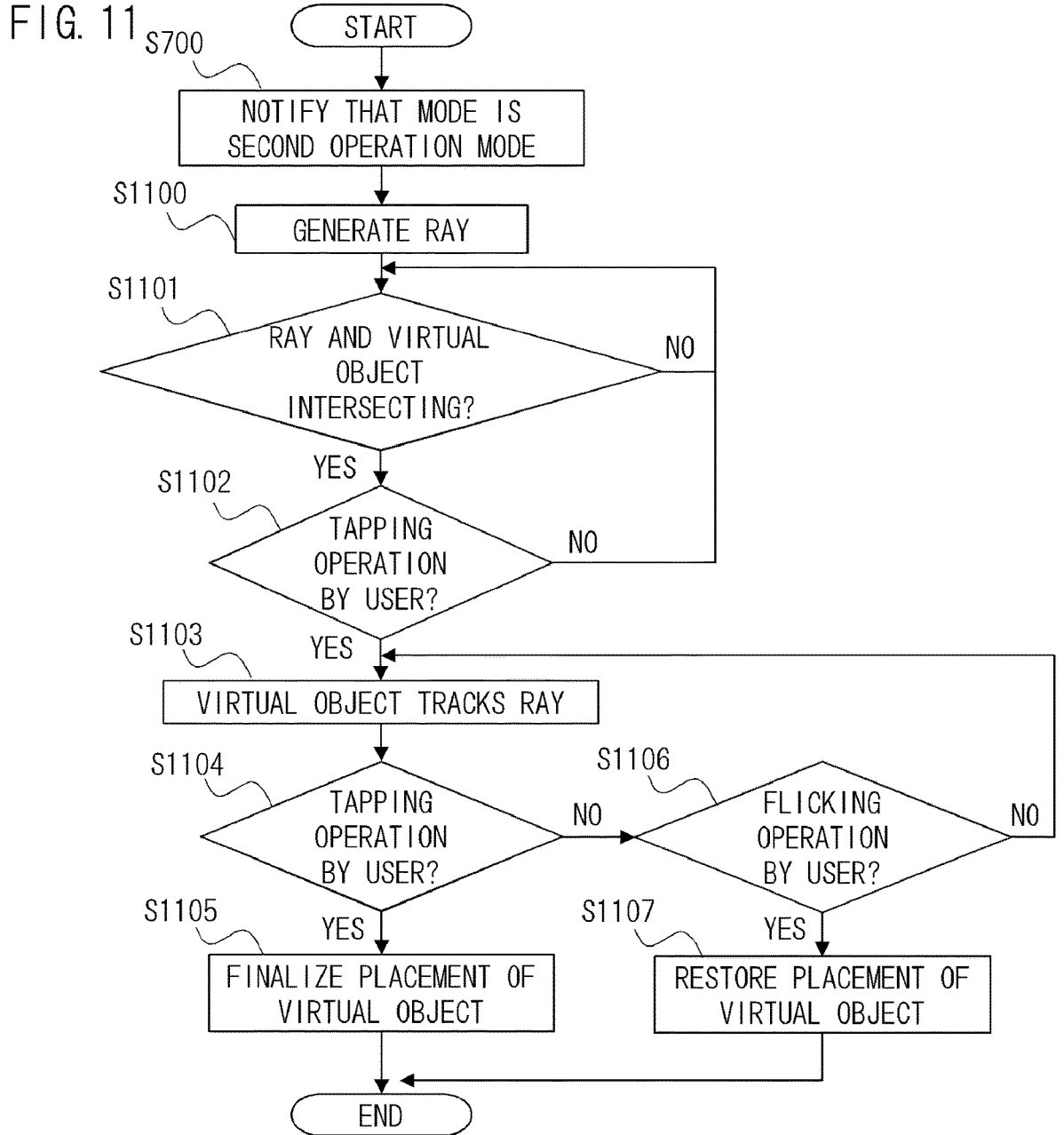
FIG. 11 is a flowchart of application operations in the second operation mode according to the second embodiment.

FIG. 11 is a flowchart of processing in step S504 for performing application operations to change the placement of a virtual object in the second operation mode. Processing that is the same as in FIG. 7 is denoted by the same signs, and description thereof will be omitted.

In step S1100, the operation mode reception unit 116 notifies the virtual UI generating unit 108 that the operation mode is the second operation mode. Upon receiving the notification, the virtual UI generating unit 108 generates the ray 1000 such as illustrated in FIG. 10A in the virtual space. The position and attitude of the ray 1000 is updated on the basis of the position and attitude measured by the mobile terminal position-and-attitude measurement unit 105. The processing then transitions to step S1101.

In step S1101, the virtual UI generating unit 108 determines whether or not the ray 1000 and the virtual object intersect. In a case of intersecting, the virtual space is updated such that it is clear that the relevant virtual object is selected. The processing then transitions to step S1102. In a case of not intersecting, the processing transitions to step S1101.

In step S1102, the operation unit 119 receives whether or not the user has performed a tapping operation. In a case in which a tapping operation is received, the operation unit 119 transmits the selection operation to the operation reception unit 109. The processing then transitions to step S1103. In a case in which no tapping operation is received, the processing transitions to step S1101.

In step S1103, the operation reception unit 109 notifies the application operation unit 110 of the selection operation. The application operation unit 110 changes the settings such that the position and attitude of the virtual object that is selected is updated, tracking the position and attitude of the ray. The processing then transitions to step S1105.

In step S1104, the operation unit 119 receives whether or not the user has performed a tapping operation. In a case in which a tapping operation is received, the operation unit 119 transmits the selection operation to the operation reception unit 109. The processing then transitions to step S1105. In a case in which no tapping operation is received, the processing transitions to step S1106.

In step S1105, the operation reception unit 109 notifies the application operation unit 110 of the selection operation. The application operation unit 110 stops updating in which the position and attitude of the virtual object tracks the position and attitude of the ray, and finalizes the placement of the virtual object at the position and attitude at the point in time of receiving the selection operation. The processing then transitions to step S505. Accordingly, a virtual image is generated by the virtual image generating unit 112 in a state in which the placement of the virtual object is changed, and the change in placement of the virtual object can be realized by superimposing the generated virtual image on the real image by the mixed reality image generating unit 113.

In step S1106, the operation unit 119 receives whether or not the user has performed a flicking operation. In a case in which a flicking operation is received, the operation unit 119 transmits a cancel operation to the operation reception unit 109. The processing then transitions to step S1107. In a case in which no flicking operation is received, the processing transitions to step S1103. While a case is described in the present embodiment in which the cancel operation is assigned to the flicking operation, the present invention is not limited to this. It is sufficient as long as the input operation assigned to the cancel operation can be differentiated from the deciding operation. That is to say, this may be a double-tapping operation, or may be an amount of change of the position and attitude of the mobile terminal being no less than a threshold value.

In step S1107, the operation reception unit 109 notifies the application operation unit 110 of the cancel operation. The application operation unit 110 stops updating such that the position and attitude of the virtual object tracks the position and attitude of the ray, and restores the position and attitude thereof to that before tracking the ray. The processing then transitions to step S505.

According to the present embodiment, changing application operations that can be performed at the mobile terminal, between when the mobile terminal is visually recognizable and when the mobile terminal is not visually recognizable, enables suitable application operations in an MR experience.

Although suitable embodiments of the present invention have been described above, the present invention is not limited to these embodiments, and various modifications and alterations can be made without departing from the spirit and scope thereof.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, suitable operations using a mobile terminal in an MR experience can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-146474, filed on Sep. 14, 2022, which is hereby incorporated by reference herein in its entirety.

What is claimed is:

1. An information processing apparatus, comprising:
a processor; and
a memory storing a program which, when executed by the processor, causes the information processing apparatus to
generate an image to be displayed on a display device that is mountable to a head of a user,
decide an operation mode of an application, and
accept an input operation from a mobile terminal that the user is capable of holding and operating, and perform an application operation on the basis of the operation mode and the input operation, wherein
the program which, when executed by the processor, further causes the information processing apparatus to:

generate a mixed reality image in which a virtual object is superimposed on a captured image, determine whether or not the user can visually recognize the mobile terminal based on whether or not the mobile terminal can be visually recognized in the mixed reality image without being blocked by the virtual object based on a positional relationship between the mobile terminal and the virtual object in the mixed reality image, and decide a first operation mode, in which the application operation is performed by the user operating the mobile terminal, as the operation mode in a case where it is determined that the user can visually recognize the mobile terminal, and decide a second operation mode, in which a virtual user interface (UI) relating to an operation is displayed on the display device and the application operation is performed by the user operating the virtual UI, as the operation mode in a case where it is determined that the user cannot visually recognize the mobile terminal.

2. The information processing apparatus according to claim 1, wherein the program which, when executed by the processor, further causes the information processing apparatus to acquire a line of view direction of the user, and decide upon the second operation mode as the operation mode in a case in which the line of view direction is not directed toward the mobile terminal.

3. The information processing apparatus according to claim 1, wherein the second operation mode is an operation mode in which the user operates the virtual UI by operating the mobile terminal.

4. The information processing apparatus according to claim 1, wherein the program, when executed by the processor, further causes the information processing apparatus to:

measure a position and attitude of at least a part of the body of the user, and the second operation mode is an operation mode in which the virtual UI is operated on the basis of the position and attitude of at least the part of the body of the user.

5. The information processing apparatus according to claim 4, wherein the at least part of the body of the user is a finger of the user.

6. The information processing apparatus according to claim 4, wherein the at least part of the body of the user is a line of view of the user.

7. The information processing apparatus according to claim 1, wherein the virtual UI includes a ray that is a pointing object.

8. The information processing apparatus according to claim 1, wherein, in the second operation mode, the virtual UI is operated on the basis of a position and attitude of the mobile terminal.

9. The information processing apparatus according to claim 1, wherein, in the first operation mode, a graphical user interface (GUI) for performing an application operation is displayed on a display of the mobile terminal, and the application operation is performed on the basis of operation performed with respect to the GUI.

10. The information processing apparatus according to claim 1, wherein the program, when executed by the processor, further causes the information processing apparatus to:

determine whether or not the user can visually recognize the mobile terminal on the basis of a position and attitude of the display device and a position and attitude of the mobile terminal.

11. The information processing apparatus according to claim 1, wherein the program, when executed by the processor, further causes the information processing apparatus to:

determine whether or not the user can visually recognize the mobile terminal on the basis of whether or not the display device and the mobile terminal are facing each other.

12. The information processing apparatus according to claim 1, wherein the program, when executed by the processor, further causes the information processing apparatus to:

in the determining, determine whether or not the virtual object is rendered superimposed on a region of the mobile terminal in the captured image included in the mixed reality image.

13. The information processing apparatus according to claim 1, wherein the program, when executed by the processor, further causes the information processing apparatus to:

in the determining, further take into consideration whether or not a resolution is sufficient for the user to visually recognize a display of the mobile terminal on the display device when displaying the captured image on the display device.

14. The information processing apparatus according to claim 1, wherein the program, when executed by the processor, further causes the information processing apparatus to:

in the determining, determine whether or not the user can visually recognize the mobile terminal by judging whether or not the mobile terminal is in the captured image by image recognition.

15. The information processing apparatus according to claim 1, wherein the program, when executed by the processor, further causes the information processing apparatus to:

once operations based on the decided operation mode are started, maintain the decided operation mode without changing the operation mode until the operations are completed or cancelled.

16. A control method of a computer, the control method comprising:

generating an image to be displayed on a display device that is mountable to the head of a user;

deciding an operation mode of an application;

accepting an input operation from a mobile terminal that the user is capable of holding and operating, and performing an application operation on the basis of the operation mode and the input operation;

generating a mixed reality image in which a virtual object is superimposed on a captured image; and determining whether or not the user can visually recognize the mobile terminal based on whether or not the mobile terminal can be visually recognized in the mixed reality image without being blocked by the virtual object based on a positional relationship between the mobile terminal and the virtual object in the mixed reality image, wherein, in the deciding, a first operation mode, in which the application operation is performed by the user operating the mobile terminal, the operation mode is decided in a case where it is determined in the determining that the user can visually recognize the mobile terminal, and a second operation mode, in which a virtual user interface (UI) relating to an operation is displayed on the display device and the application operation is performed by the user operating the virtual UI, is decided as the operation mode in a case where it is determined in the determining that the user cannot visually recognize the mobile terminal.

17. A non-transitory computer readable medium that stores a program, wherein the program causes a computer to execute a control method of an information processing apparatus, and the control method comprises:

generating an image to be displayed on a display device that is mountable to the head of a user;

deciding an operation mode of an application;

accepting an input operation from a mobile terminal that the user is capable of holding and operating, and performing an application operation on the basis of the operation mode and the input operation;

generating a mixed reality image in which a virtual object is superimposed on a captured image; and determining whether or not the user can visually recognize the mobile terminal based on whether or not the mobile terminal can be visually recognized in the mixed reality image without being blocked by the virtual object based on a positional relationship between the mobile terminal and the virtual object in the mixed reality image, wherein, in the deciding, a first operation mode, in which the application operation is performed by the user operating the mobile terminal, the operation mode is decided in a case where it is determined in the determining that the user can visually recognize the mobile terminal, and a second operation mode, in which a virtual user interface (UI) relating to an operation is displayed on the display device and the application operation is performed by the user operating the virtual UI, is decided as the operation mode in a case where it is determined in the determining that the user cannot visually recognize the mobile terminal.

* * * * *